March 11, 1958 T. J. WEBSTER 2,826,480
REMOVAL OF OXYGEN OR HYDROGEN FROM GASES
Filed Jan. 12, 1954
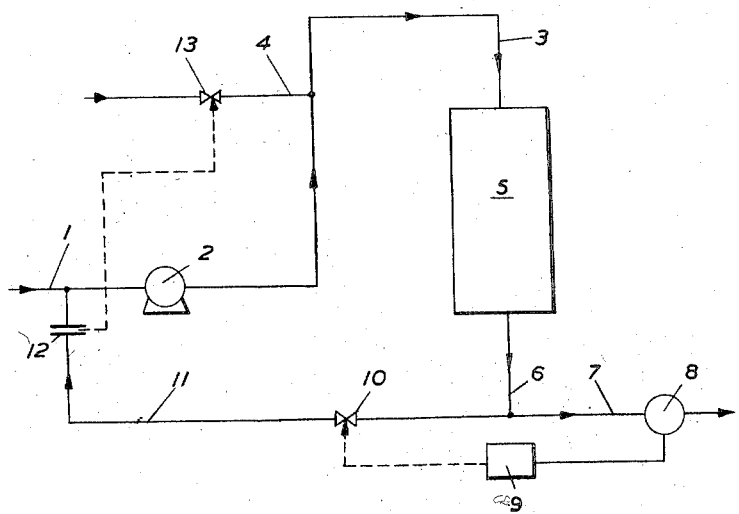
Inventor
THOMAS J. WEBSTER
By [signature]
Attorney United States Patent Office 2,826,480
Patented Mar. 11, 1958

2,826,480

REMOVAL OF OXYGEN OR HYDROGEN FROM GASES

Thomas John Webster, London, England, assignor to The British Oxygen Company Limited, a British company Application January 12, 1954, Serial No. 403,512

Claims priority, application Great Britain February 12, 1953

4 Claims. (Cl. 23—2)

This invention relates to the purification of gases or gas mixtures and relates more particularly to the removal of oxygen or hydrogen from inert gases or gas mixtures containing them. By "inert" gas or gas mixtures is meant any gas or mixture which is not contaminated under the purification conditions used and which does not react with any materials used in the purification; particularly important examples of such gases are nitrogen and the inert gases argon, krypton, helium, neon and mixtures of these gases.

A method frequently employed for the removal of oxygen or hydrogen from an inert gas or gas mixture consists in the admixture of sufficient hydrogen or oxygen with the crude gas to provide equivalent amounts of hydrogen and oxygen in the mixture followed by the passage of the resulting gas mixture through a purification stage which may comprise a burner or a suitable catalyst or both in which the hydrogen and oxygen are caused to combine to form water which can then be eliminated by normal drying methods.

To eliminate completely the hydrogen or oxygen originally present in the gas using such a process it is essential that the rate of admixture of hydrogen or oxygen to the gas entering the purifier be so controlled as to ensure that there will be no excess of either hydrogen or oxygen over the stoichiometric requirement in the final mixture and in practice difficulty is frequently experienced in satisfying this condition. For example if 100 s. ft.$^3$/hr. of crude gas containing 2.0% of oxygen is initially purified to 100 p. p. m. oxygen then the following conditions arise:

Oxygen present in crude gas=2.0 s. ft.$^3$/hr.
Oxygen leaving purifier=0.01 s. ft.$^3$/hr.
Therefore oxygen removed in purifier=1.99 s. ft.$^3$/hr.
Therefore hydrogen added=3.98 s. ft.$^3$/hr.
And hydrogen deficiency=.02 s. ft.$^3$/hr.

To correct the hydrogen deficiency so as to produce pure gas containing no oxygen it is therefore necessary to increase the rate of admixture of hydrogen to the crude gas from 3.98 to 4.0 s. ft.$^3$/hr. i. e. about 0.5%. Outlet oxygen concentrations of 10 p. p. m. and 1.0 p. p. m. would demand increases in the hydrogen flowrate of .05% and .005% respectively and it is doubtful is a sufficiently accurate mechanism for adjusting the hydrogen flowrate could ever be found in practice to ensure the complete elimination of oxygen from the gas considered in the above example. Similar conditions will of course arise where the initial impurity is hydrogen.

It is an object of the present invention to provide a method for removing completely or to a substantial degree oxygen or hydrogen from admixture in any quantity with an inert gas or gas mixture as hereinbefore defined, which method is continuous and fully automatic is operation and which is largely independent of the pressure of such gas or gas mixture and of the concentration of impurity therein.

According to the present invention, a process for the removal of oxygen or hydrogen from admixture with an inert gas or gas mixture as hereinbefore defined comprises adding thereto an amount of hydrogen or oxygen approximately stoichiometrically equivalent to the oxygen or hydrogen present in the crude gas and thereafter converting the hydrogen and oxygen present to water, an amount of purified gas being mixed with the crude gas prior to such addition such that the impurity content of the crude gas is maintained stoichiometrically equivalent to the hydrogen or oxygen added.

The recycling of purified gas provides a more sensitive method of control of the proportions of oxygen and hydrogen than varying the injection rate of the added gas, since as shown in the following examples, the amount of purified gas which it is necessary to recycle to correct for a given impurity excess greatly exceeds the additional added gas necessary to produce the same effect.

Assuming as in the previous example, that 100 s. ft.$^3$/hr. of crude gas containing 2% of oxygen is initially purified to 100 p. p. m. oxygen, then:

Hydrogen injection rate=3.98 s. ft.$^3$/hr.
Additional hydrogen needed to correct oxygen excess= 0.02 s. ft.$^3$/hr.
Therefore, percentage increase in hydrogen flowrate= 0.5%
Direct recycle of purified gas to correct oxygen excess= 0.5 s. ft.$^3$/hr.

When the crude gas is initially purified to 1.0 p. p. m. in excess oxygen then:

Hydrogen injection rate=3.9998 s. ft.$^3$/hr.
Additional hydrogen needed to correct oxygen excess= .0002 s. ft.$^3$/hr.
Therefore, percentage increase in hydrogen flowrate= 0.005%
Direct recycle of purified gas to correct oxygen excess= 0.005 s. ft.$^3$/hr.

Assuming a maximum recycle of 0.5 s. ft.$^3$/hr. which incidentally would be too small to significantly affect the pure gas production rate, a variation of .005 s. ft.$^3$/hr. is equivalent to 1.0% of the maximum flow and could therefore easily be achieved in practice i. e. the purifier can be controlled to give gas containing only a few parts per million of oxygen or hydrogen. The method can also be arranged to provide recycle control for hydrogen excess at the purifier outlet. This would mean recycling a small amount of gas say 0.5 s. ft.$^3$/hr. (in the above example) under normal conditions which could be increased to correct for oxygen excess or decreased to correct for hydrogen excess. The hydrogen injection rate would of course have to be roughly adjusted to the required rate and a suitable setting could easily be found by observing the amount of recycle necessary to give pure oxygen/hydrogen free gas. An excessive flow rate of recycle gas would indicate that more hydrogen was required. The recycle may be controlled manually from the indications of a hydrogen and an oxygen analyser positioned at the outlet of the purifier or automatically by coupling a differential hydrogen-oxygen detector to a controller arranged to operate a valve controlling the flow of recycle gas. The hydrogen injection rate may be adjusted automatically or manually from the recycle gas flow rate so as to maintain the recycle flowrate within a predetermined range. Thus if the recycle flow rate began to exceed the desired maximum the hydrogen flowrate would be increased, thus avoiding the necessity for recycling an excessive amount of gas.

By steering the recycle flow according to the purity of the gas leaving the purifier, control is effected independently of fluctuations in the crude throughput, pressure and oxygen or hydrogen content and a knowledge of changes in these variables within reasonable limits is not essential in operating the unit.

If exceptionally high final purities of the purified gas are required, the unavoidable fluctuations in the injection rate of the added hydrogen or oxygen, which may occur even with the most perfect injection device, may in certain cases not allow sufficiently quick adjustment of the recycle rate. In this case, a "guard reactor" may be provided after the catalyst and the analysis point which would remove any incidental and temporary excess of hydrogen or oxygen in the product. This reactor would consist of a mass which is easily oxidisable or reducible such as copper/copper oxide or manganese oxides. These substances would preferably be used in a finely divided form, for instance impregnated on a non-reactive support such as kieselguhr, silica gel or alumina gel.

The invention will now be more particularly described with reference to the accompanying drawing which illustrates diagrammatically one method of carrying out the invention.

The crude gas containing oxygen or hydrogen as impurity entering line 1 is discharged by a blower or compressor 2 to line 3 and passed, after the admixture of hydrogen or oxygen as the case may be through branch line 4, to the purifier 5 in which all the oxygen and hydrogen present in the gas is eliminated as water.

The purified gas leaves the purifier 5 through line 6 and passes to line 7 where it is analysed by an oxygen-hydrogen detector 8. The impulses from the detector 8 are received by a controller 9 which operates valve 10 on a by-pass line 11, connecting lines 6 and 1, and through which purified gas from line 6 can pass to line 1. A flow controller 12 is provided in line 11 and operates a valve 13 which roughly controls the rate of addition of hydrogen or oxygen through line 4.

In operation, should the amount of impurity present in the crude gas be in excess of the stoichiometric amount required to react with the oxygen or hydrogen added through line 4, some of this impurity will still be present in the purified gas passing through the detector 8, and this detector will activate controller 9 to open valve 10 so as to increase the quantity of purified gas recycled until the impurity concentration in the gas entering the purifier is stoichiometrically equivalent to the added oxygen or hydrogen.

Should the impurity concentration in the crude gas become so high that an excessive flow of purified gas through line 11 is required, the flow controller 12 acts to open valve 13 to increase the addition of oxygen or hydrogen until it again roughly corresponds to that required to react with the impurity in the crude gas.

In the event of a fall in the impurity concentration, the valves 10 and 13 will be closed in an analagous manner by the operation of detector 8 and flow controller 12.

I claim:

1. In a flow system wherein crude gas, consisting of a mixture of an inert gas or gases as hereinbefore defined with one element of water present as impurity, is introduced continuously at one point, is purified, and then is withdrawn at another point; a process for removing the impurity continuously which comprises, continuously adding to the incoming crude gas an amount of the other element of water approximately stoichiometrically equivalent to the impurity present therein, thereafter converting entrained hydrogen and oxygen to water to purify the mixture, withdrawing purified gas from the system, analyzing the gas as withdrawn to detect the presence of any impurity in excess of the stoichiometric amount required for conversion to water, and, in response to any detected impurity, recycling a portion of the purified gas into the incoming crude gas in advance of the addition of the element of water thereto until the presence of impurity in the purified gas being withdrawn from the system is no longer detected.

2. In a process according to claim 1, automatically regulating the volume of purified gas being recycled by the amount of impurity detected.

3. In a process according to claim 1, varying the rate of addition of the element of water being added to the incoming crude gas in response to variations in the volume of purified gas being recycled whereby to maintain an approximate stoichiometric equivalence between hydrogen and oxygen entrained in the crude gas after such addition.

4. In a process according to claim 1, the additional step of removing from the product gas as it is withdrawn from the system any impurity temporarily in excess therein.

References Cited in the file of this patent

UNITED STATES PATENTS

| | | |
|---|---|---|
| 2,338,402 | Brandt | Jan. 4, 1944 |
| 2,582,885 | Rosenblatt | Jan. 15, 1952 |
| 2,631,925 | Cohn | Mar. 17, 1953 |
| 2,695,836 | Gilmore | Nov. 30, 1954 |